United States Patent
Agrawal et al.

(10) Patent No.: US 12,273,690 B2
(45) Date of Patent: Apr. 8, 2025

(54) SPEAKER TYPE FOR AUDIO OUTPUT

(71) Applicant: Motorola Mobility LLC, Chicago, IL (US)

(72) Inventors: Amit Kumar Agrawal, Bangalore (IN); Rohit Sisodia, Naperville, IL (US); Michael E Russell, Lake Zurich, IL (US)

(73) Assignee: Motorola Mobility LLC, Chicago, IL (US)

( * ) Notice: Subject to any disclaimer, the term of this patent is extended or adjusted under 35 U.S.C. 154(b) by 310 days.

(21) Appl. No.: 18/065,093

(22) Filed: Dec. 13, 2022

(65) Prior Publication Data

US 2024/0196130 A1    Jun. 13, 2024

(51) Int. Cl.
| | |
|---|---|
| *H04R 29/00* | (2006.01) |
| *G01S 5/02* | (2010.01) |
| *G06F 3/16* | (2006.01) |
| *H04R 3/00* | (2006.01) |

(52) U.S. Cl.
CPC .............. *H04R 3/00* (2013.01); *G01S 5/0284* (2013.01); *G06F 3/165* (2013.01); *H04R 2420/07* (2013.01)

(58) Field of Classification Search
CPC ................................. H04R 3/00; G06F 3/165
USPC ............................................................ 381/74
See application file for complete search history.

(56) References Cited

U.S. PATENT DOCUMENTS

| | | | |
|---|---|---|---|
| 10,123,142 B2 * | 11/2018 | Lee | H04S 7/308 |
| 10,484,832 B1 | 11/2019 | Tyagi et al. | |
| 10,499,194 B1 | 12/2019 | Tyagi et al. | |
| 10,869,166 B2 | 12/2020 | Tyagi et al. | |
| 11,051,260 B2 | 6/2021 | Gorsica et al. | |
| 11,520,550 B1 | 12/2022 | Bushnell et al. | |
| 11,669,297 B2 | 6/2023 | Dong et al. | |
| 11,729,551 B2 * | 8/2023 | Ahmed | H04R 3/12 381/77 |
| 12,004,046 B2 | 6/2024 | Russell et al. | |
| 12,152,902 B2 | 11/2024 | Russell et al. | |
| 12,192,719 B2 | 1/2025 | Davis et al. | |
| 2007/0254626 A1 | 11/2007 | Ahlgren | |
| 2012/0230525 A1 | 9/2012 | Higuchi et al. | |
| 2014/0375531 A1 | 12/2014 | Latypov et al. | |

(Continued)

FOREIGN PATENT DOCUMENTS

| | | |
|---|---|---|
| CN | 107907857 A | 4/2018 |
| CN | 107991647 A | 5/2018 |

(Continued)

OTHER PUBLICATIONS

"[Update] Introducing the New Galaxy SmartTag+: The Smart Way to Find Lost Items", Samsung US Newsroom [online][retrieved Jun. 29, 2021]. Retrieved from the Internet <https://news.samsung.com/us/introducing-the-new-galaxy-smarttag-plus/>., May 11, 2021, 8 Pages.

(Continued)

*Primary Examiner* — William J Deane, Jr.

(74) *Attorney, Agent, or Firm* — FIG. 1 Patents

(57) ABSTRACT

Techniques for speaker type for audio output are described. For instance, the described techniques can be implemented to adapt audio output of an audio system to user position in an environment as well as speaker types for audio devices of the audio system.

20 Claims, 8 Drawing Sheets

(56) References Cited

U.S. PATENT DOCUMENTS

| | | | | |
|---|---|---|---|---|
| 2015/0230040 | A1* | 8/2015 | Squires | H04S 7/302 |
| | | | | 381/303 |
| 2016/0021481 | A1 | 1/2016 | Johnson et al. | |
| 2016/0212579 | A1 | 7/2016 | Duan et al. | |
| 2016/0324140 | A1* | 11/2016 | Gregorich | A01M 31/004 |
| 2017/0289951 | A1 | 10/2017 | Dey et al. | |
| 2019/0340396 | A1 | 11/2019 | Mills et al. | |
| 2020/0037112 | A1* | 1/2020 | Tyagi | H04B 17/27 |
| 2020/0314534 | A1* | 10/2020 | Kobayashi | G10K 11/178 |
| 2020/0351586 | A1* | 11/2020 | Fei | G06F 3/165 |
| 2021/0241551 | A1 | 8/2021 | Loeshelle | |
| 2022/0201427 | A1* | 6/2022 | Rechenberger | H04W 4/025 |
| 2022/0283321 | A1 | 9/2022 | Ng et al. | |
| 2023/0078485 | A1 | 3/2023 | Russell et al. | |
| 2023/0079580 | A1 | 3/2023 | Russell et al. | |
| 2023/0319475 | A1 | 10/2023 | Davis et al. | |
| 2024/0196154 | A1* | 6/2024 | Sabatier | H04S 7/303 |
| 2024/0241688 | A1 | 7/2024 | Russell et al. | |

FOREIGN PATENT DOCUMENTS

| | | |
|---|---|---|
| CN | 108650623 A | 10/2018 |
| CN | 109725338 A | 5/2019 |
| CN | 109754553 A | 5/2019 |
| CN | 111103611 | 5/2020 |
| CN | 111103611 A | 5/2020 |
| CN | 113115208 A | 7/2021 |
| CN | 113453147 A | 9/2021 |
| CN | 217643343 U | 10/2022 |
| EP | 3680687 A1 | 7/2020 |
| KR | 102104088 B1 | 4/2020 |

OTHER PUBLICATIONS

"Car Connectivity Consortium", Car Connectivity Consortium [retrieved Jun. 28, 2021]. Retrieved from the Internet <https://carconnectivity.org/>., Feb. 22, 2018, 6 Pages.

"FiRa Consortium, Inc.", FiRa Consortium, Inc. [retrieved Jun. 28, 2021]. Retrieved from the Internet <https://www.firaconsortium.org/>., Aug. 1, 2019, 3 Pages.

"Hands-Free Profile 1.8", Bluetooth SIG, Inc. [retrieved Nov. 21, 2022]. Retrieved from the Internet <https://www.bluetooth.com/specifications/specs/hands-free-profile-1-8/>., Apr. 14, 2022, 139 Pages.

"IEEE Standard for Low-Rate Wireless Networks-Amendment 1: Enhanced Ultra Wideband (UWB) Physical Layers (PHYs) and Associated Ranging Techniques", IEEE 802.15.4z-2020 [retrieved Nov. 16, 2022]. Retrieved from the Internet <10.1109/IEEESTD.2020.9179124>., Aug. 25, 2020, 174 Pages.

"Proximity Profile (PXP)", Bluetooth SIG, Inc. [retrieved Nov. 18, 2022]. Retrieved from the Internet <https://www.bluetooth.com/specifications/specs/proximity-profile-1-0-1/>., Jan. 25, 2022, 11 Pages.

"Proximity Profile 1.0.1", Bluetooth SIG, Inc. [retrieved Nov. 18, 2022]. Retrieved from the Internet <https://www.bluetooth.com/specifications/specs/proximity-profile-1-0-1/>., Jul. 14, 2015, 20 Pages.

"Specifications Basic Audio Profile", Bluetooth SIG, Inc., Generic Audio Working Group [retrieved Nov. 21, 2022]. Retrieved from the Internet <https://www.bluetooth.com/specifications/bap-html/>., Jun. 21, 2022, 189 Pages.

"Test Suite (TS)", Bluetooth SIG, Inc. [retrieved Nov. 18, 2022]. Retrieved from the Internet <https://www.bluetooth.com/specifications/specs/proximity-profile-1-0-1/>., Jul. 29, 2019, 23 Pages.

"The proximity profile 1.0.1", Bluetooth SIG, Inc [retrieved Nov. 21, 2022]. Retrieved from the Internet <https://www.bluetooth.com/specifications/specs/proximity-profile-1-0-1/>., Jul. 14, 2015, 20 Pages.

"Tile Bluetooth Tracking Device", Tile Inc. [retrieved Jun. 28, 2021]. Retrieved from the Internet <https://www.thetileapp.com/en-us/how-it-works>., 2012, 18 Pages.

Agrawal, Amit Kumar, et al., "US Application as Filed", U.S. Appl. No. 18/065,093, filed Dec. 13, 2022, 42 pages.

Davis, Giles T, et al., "US Application as Filed", U.S. Appl. No. 17/708,410, filed Mar. 30, 2022, 61 pages.

Haselton, Todd, "Here's how Apple's AirTag trackers compare to Tile, and why the company is so upset with Apple", CNBC [online][retrieved Jun. 29, 2021]. Retrieved from the Internet <https://www.cnbc.com/2021/04/27/apple-airtags-versus-tile-tracker-how-they-compare.html>., Apr. 27, 2021, 8 Pages.

Pirch, Hans-Juergen, et al., "Introduction to Impulse Radio UWB Seamless Access Systems", FiRa Consortium [retrieved Jun. 28, 2021]. Retrieved from the Internet <https://www.firaconsortium.org/sites/default/files/2020-04/fira-introduction-impulse-radio-uwb-wp-en.pdf>., Feb. 2020, 15 Pages.

Russell, Michael E, et al., "US Application as Filed", U.S. Appl. No. 18/097,611, filed Jan. 17, 2023, 71 pages.

Russell, Michael E, et al., "US Application as Filed", U.S. Appl. No. 17/473,477, filed Sep. 13, 2021, 61 pages.

Russell, Michael E, et al., "US Application as Filed", U.S. Appl. No. 17/473,671, filed Sep. 13, 2021, 62 pages.

U.S. Appl. No. 17/708,410, filed Oct. 12, 2023, "Non-Final Office Action", U.S. Appl. No. 17/708,410, filed Oct. 12, 2023, 15 pages.

U.S. Appl. No. 17/473,477, filed Feb. 12, 2024, "Advisory Action", U.S. Appl. No. 17/473,477, filed Feb. 12, 2024, 3 pages.

U.S. Appl. No. 17/473,477, filed Dec. 29, 2023, "Final Office Action", U.S. Appl. No. 17/473,477, filed Dec. 29, 2023, 5 pages.

U.S. Appl. No. 17/473,671, filed Jan. 24, 2024, "Notice of Allowance", U.S. Appl. No. 17/473,671, filed Jan. 24, 2024, 7 pages.

U.S. Appl. No. 17/708,410, filed Jan. 30, 2024, "Final Office Action", U.S. Appl. No. 17/708,410, filed Jan. 30, 2024, 18 pages.

U.S. Appl. No. 17/473,477, filed Jul. 17, 2024, "Notice of Allowance", U.S. Appl. No. 17/473,477, filed Jul. 17, 2024, 8 pages.

U.S. Appl. No. 17/708,410, filed Sep. 3, 2024, "Notice of Allowance", U.S. Appl. No. 17/708,410, filed Sep. 3, 2024, 9 pages.

U.S. Appl. No. 17/473,477, filed Apr. 8, 2024, "Non-Final Office Action", U.S. Appl. No. 17/473,477, filed Apr. 8, 2024, 6 pages.

U.S. Appl. No. 17/473,671, filed Mar. 27, 2024, "Corrected Notice of Allowability", U.S. Appl. No. 17/473,671, filed Mar. 27, 2024, 2 pages.

U.S. Appl. No. 17/473,671, filed May 6, 2024, "Corrected Notice of Allowability", U.S. Appl. No. 17/473,671, filed May 6, 2024, 2 pages.

U.S. Appl. No. 17/708,410, filed May 13, 2024, "Non-Final Office Action", U.S. Appl. No. 17/708,410, filed May 13, 2024, 22 pages.

U.S. Appl. No. 17/473,477, filed Sep. 14, 2023, "Non-Final Office Action", U.S. Appl. No. 17/473,477, filed Sep. 14, 2023, 12 pages.

U.S. Appl. No. 17/473,671, filed Jul. 14, 2023, "Non-Final Office Action", U.S. Appl. No. 17/473,671, filed Jul. 14, 2023, 6 pages.

GB2213053.8, "Combined Search and Examination Report", GB Application No. GB2213053.8, Feb. 23, 2023, 10 pages.

GB2213121.3, "Search Report", GB Application No. GB2213121.3, Mar. 9, 2023, 5 pages.

U.S. Appl. No. 17/473,477, filed Oct. 11, 2024, "Corrected Notice of Allowability", U.S. Appl. No. 17/473,477, filed Oct. 11, 2024, 2 pages.

U.S. Appl. No. 17/473,477, filed Oct. 24, 2024, "Corrected Notice of Allowability", U.S. Appl. No. 17/473,477, filed Oct. 24, 2024, 2 pages.

* cited by examiner

SPEAKER TYPE FOR AUDIO OUTPUT

BACKGROUND

Current connected environments provide a variety of opportunities for content consumption, such as video content and audio content. Further, audio output systems can be situated in different environments to provide for different audio output scenarios.

BRIEF DESCRIPTION OF THE DRAWINGS

Aspects of speaker type for audio output are described with reference to the following Figures. The same numbers may be used throughout to reference similar features and components that are shown in the Figures. Further, identical numbers followed by different letters reference different instances of features and components described herein.

DETAILED DESCRIPTION

Techniques for speaker type for audio output are described. For instance, the described techniques can be implemented to adapt audio output of an audio system to user position in an environment as well as speaker types for audio devices of the audio system.

For instance, consider that an audio system is positioned within a particular environment, such as a home, an office, a public facility, etc. Further, the audio system includes multiple audio devices that are positioned at different locations within the environment. A person within the environment carries a client device that can interconnect with the audio system to determine a location of the client device within the environment. In at least one implementation the client device represents a wearable device, such as a smart neckband, a smartwatch, smart glasses, etc. Further, the client device and the audio system can interconnect via wireless communication, such as via ultra-wideband (UWB) connectivity.

Accordingly, via the wireless interconnectivity, a position of the client device within the environment can be determined. For instance, UWB signals can be exchanged between the client device and the audio devices of the audio system to determine a position of the client device relative to the audio devices. Further, based on the position of the client device and attributes of the audio devices of the audio system, audio output of the audio devices can be adapted. In implementations, attributes of the audio devices include speaker types of the audio devices. Examples of different speaker types include single sided speakers, multi-sided speakers, and 360 degree speakers. Thus, different speaker types can have different audio output directionality, which can affect user perception of audio output from different audio devices. Accordingly, based on client device position (and thus user position) relative to a set of audio devices and speaker types of the audio devices, one or more audio settings (e.g., volume, tone, balance, etc.) of the audio devices can be adapted to optimize user perception of audio output of the audio devices. For instance, by adapting audio output settings of the audio devices based on client device position and speaker types of the audio devices, a more consistent audio output experience can be provided that considers user position as well as speaker output characteristics of audio devices.

While features and concepts of speaker type for audio output can be implemented in any number of environments and/or configurations, aspects the described techniques are described in the context of the following example systems, devices, and methods. Further, the systems, devices, and methods described herein are interchangeable in various ways to provide for a wide variety of implementations and operational scenarios.

Figure 1:
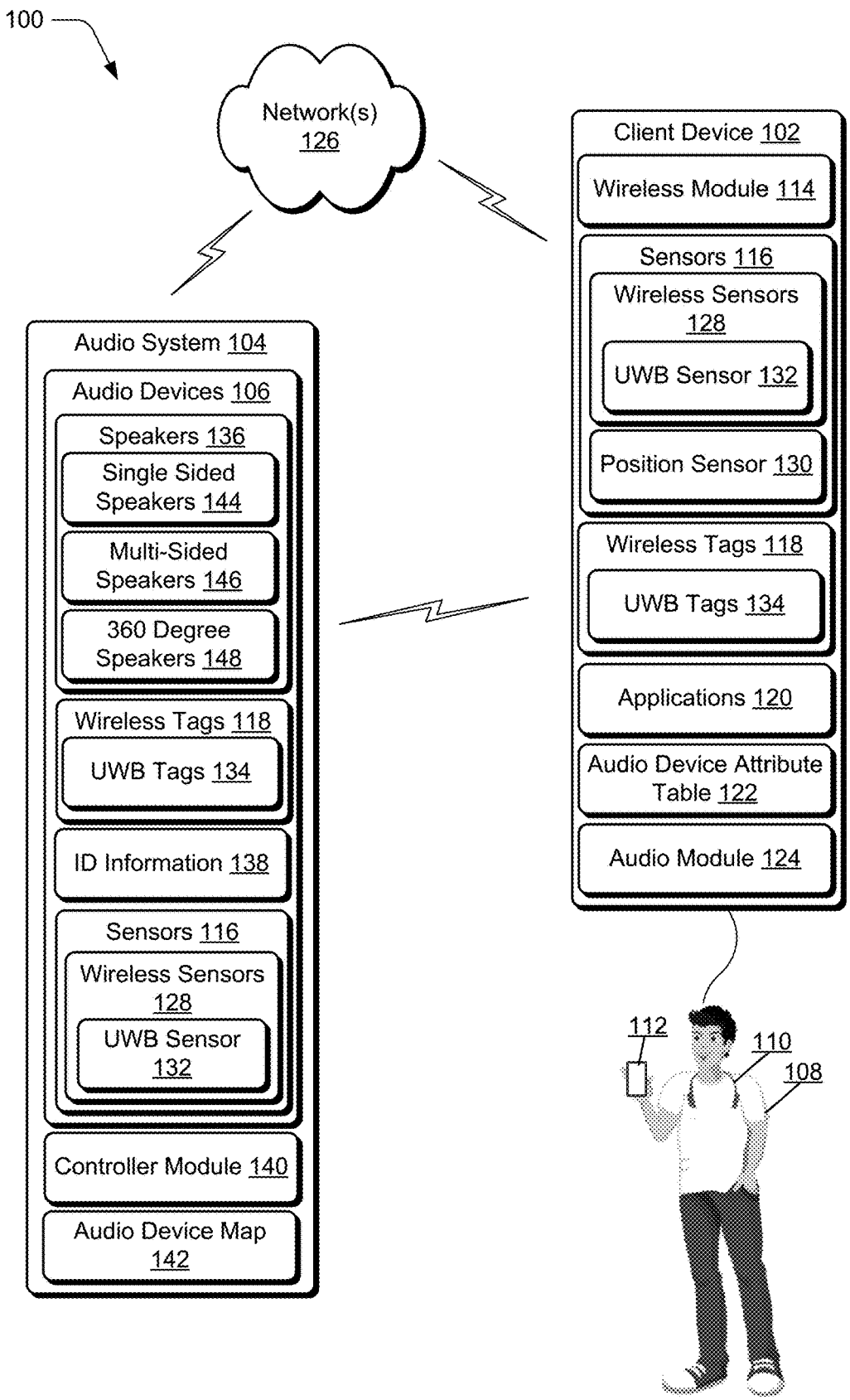
FIG. 1 illustrates an example environment in which aspects of speaker type for audio output can be implemented.

FIG. 1 illustrates an example environment 100 in which aspects of speaker type for audio output can be implemented. The environment 100 includes a client device 102 and an audio system 104, which can be implemented as different apparatus. In implementations, the audio system 104 is operable to output audio generated by the client device 102 and/or generated at the audio system 104. The audio system 104 includes audio devices 106 that are positionable at various locations throughout the environment 100 and are controllable to adjust various audio output attributes of the audio devices 106, such as volume, tone, balance, and so forth.

The client device 102 represents a device that can be carried and/or worn by a user 108, such as a wearable device, a smartphone, a portable computing device, and combinations thereof. In a wearable implementation the client device 102 can be implemented as a device such as a smart neckband 110 that can be worn by the user 108. This is not to be construed as limiting, however, and the client device 102 can be implemented via a variety of different form factors, such as a smart phone 112, etc. Example attributes of the client device 102 and/or the audio devices 106 are discussed below with reference to the device 700 of FIG. 7.

The client device 102 includes various functionality that enables the client device 102 to perform different aspects of speaker type for audio output discussed herein, including a wireless module 114, sensors 116, wireless tags 118, applications 120, an audio device attributes table 122, and an audio module 124. The wireless module 114 represents functionality (e.g., logic and hardware) for enabling the client device 102 to interconnect with other devices and/or networks. The wireless module 114, for instance, enables wireless connectivity of the client device 102, such as to the audio devices 106 and a network 126. In implementations, the client device 102 can connect to the audio system 104 via direct wireless connectivity, e.g., via UWB, Bluetooth, WiFi direct, etc. Further, the client device 102 can wirelessly interconnect with the audio system 104 via the network 126. The network 126, for instance, represents a wireless network that can be implemented via one or more radio access technologies.

The sensors 116 are representative of functionality to detect various physical and/or logical phenomena in relation to the client device 102, such as motion, light, image detection and recognition, time and date, position, location, touch detection, sound, temperature, and so forth. Examples of the sensors 116 include hardware and/or logical sensors such as an accelerometer, a gyroscope, a camera, a microphone, a clock, biometric sensors, touch input sensors, position sensors, environmental sensors (e.g., for temperature, pressure, humidity, and so on), geographical location information sensors (e.g., Global Positioning System (GPS) functionality), and so forth. In this particular example the sensors 116 include wireless sensors 128 and a position sensor 130. The sensors 116, however, can include a variety of other sensor types in accordance with the implementations discussed herein.

The wireless sensors 128 represent functionality to detect direct types of wireless signal, such as wireless signal transmitted in different frequencies. The wireless sensors 128, for instance, include an antenna and/or set of antennas tuned to detect wireless signal received via different wireless frequencies. The wireless sensors 128 include a UWB sensor 132 which is operable to receive and detect wireless signal in UWB frequencies. The position sensor 130 represents a sensor and/or set of sensors configured to detect a location and/or orientation of the client device 102.

The wireless tags 118 represent functionality that transmits wireless signal in various frequencies. For instance, the wireless tags 118 include UWB tags 134 that transmit wireless signal in UWB wireless frequencies. The applications 120 represent functionality for performing various tasks via the client device 102, such as productivity tasks, entertainment, communication, etc. In implementations the applications 120 generate audio data that is transmitted to the audio system 104 for output.

The audio device attribute table 122 represents data that describes different attributes of different types and/or instances of audio devices, including the audio devices 106. For instance, the audio device attribute table 122 maps identifiers for different instances of the audio devices 106 to corresponding attributes for the different instances of the audio devices 106. Example audio device 106 attributes that are identified by the audio device attribute table 122 include speaker type, manufacturer, audio volume capabilities, audio tone capabilities, and so forth. In implementations, audio device attributes specified by the audio device attribute table 122 can be used to adapt audio settings of the audio devices 106 to different audio output scenarios.

The audio module 124 represents functionality for implementing various aspects of speaker type for audio output such as described herein. For instance, based on a detected position of the client device 102, the audio module 124 is operable to adjust output attributes of the audio system 104, such as volume, tone, balance, and so forth, to optimize user perception of audio output of the audio system 104.

The audio system 104 represents functionality for audio output, such as audio generated by the client device 102 and transmitted from the client device 102 to the audio devices 106. The audio system 104 includes audio devices 106 which in turn include speakers 136, wireless tags 118, identification (ID) information 138, and sensors 116. Further, the audio system 104 includes a controller module 140 and an audio device map 142. The speakers 136 represent functionality for outputting audio for the audio devices 106 and are implementable in a variety of different ways, including single sided speakers 144, multi-sided speakers 146, and 360 degree speakers 148. The speakers 136, for instance, differ in their sound emission characteristics. For example, the single sided speakers 144 emit sound waves in a single direction, the multi-sided speakers 146 emit sound waves in multiple directions, and the 360 degree speakers 148 emit sound waves in all directions, e.g., at 360 degrees relative to the 360 degree speakers 148. Further attributes of the speakers 136 are discussed below.

The wireless tags 118 represent functionality that transmits wireless signal in various frequencies, such as described above, and in implementations include the UWB tags 134. The ID information 138 represents information that identifies instances of the audio devices 106 and/or attributes of the audio devices 106. Examples of the ID information 138 include an organization unique identifier (OUI) media access control address (MAC) address, a model number, a model name, a speaker description (e.g., whether a speaker 136 is a single sided speakers, multi-sided speaker 146, or a 360 degree speaker 148), and so forth. Each audio device 106 can have specific ID information 138 that is usable to determine attributes of the audio device 106. For instance, the audio module 124 of the client device 102 can map ID information 138 for different audio devices 106 to the audio device attribute table 122 to determine attributes of the audio devices 106 and adapt audio output of the audio devices 106 based on the attributes, as well as attributes of an environment in which the audio devices 106 are positioned.

The controller module 140 represents functionality for controlling operation of the audio system 104. For instance, the controller module 140 can control audio output attributes of the speakers 136 such as volume, balance, tone, and so forth. As further detailed below, the controller module 140 is operable to control output characteristics of the audio devices 106 based on a location of the client device 102 relative to the audio devices 106.

The audio device map 142 represents data that maps positions of instance of the audio devices 106 in a particular environment, such as the environment 100. For instance, the audio device map 142 includes a location mapping of each of the audio devices 106 relative to one another in a particular environment.

Figure 2A:
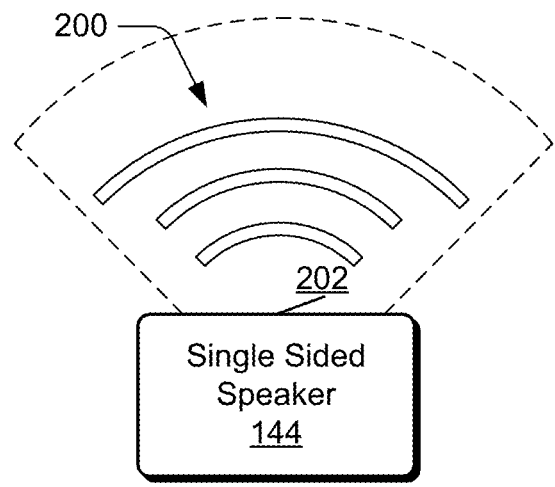
FIGS. 2a-2c depict example audio output attributes of different speakers in accordance with one or more implementations.
Figure 2B:
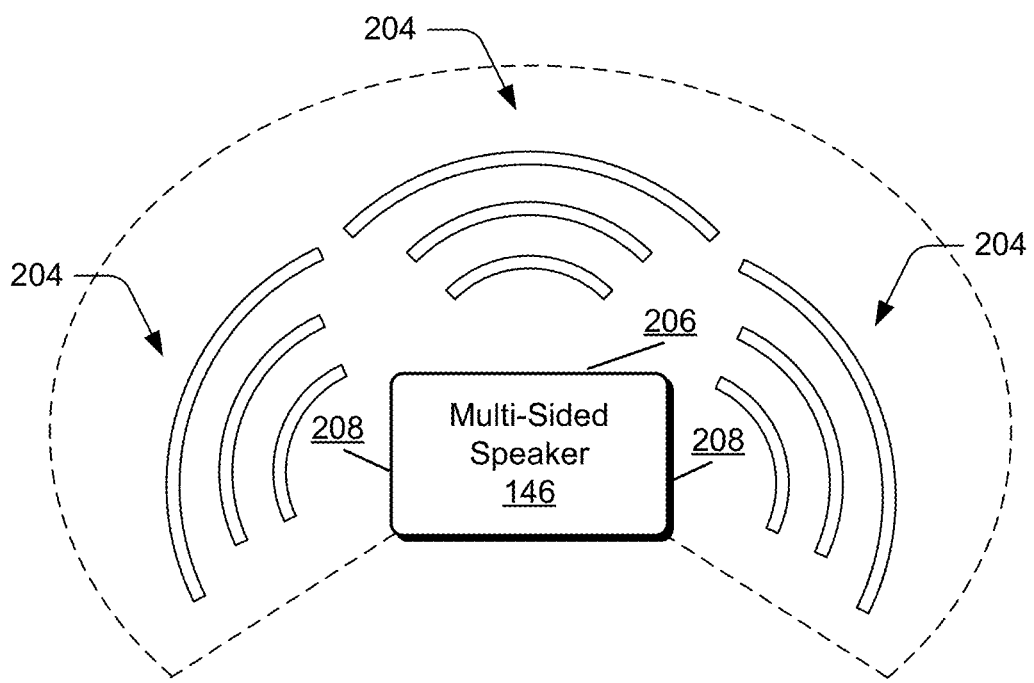
Figure 2C:
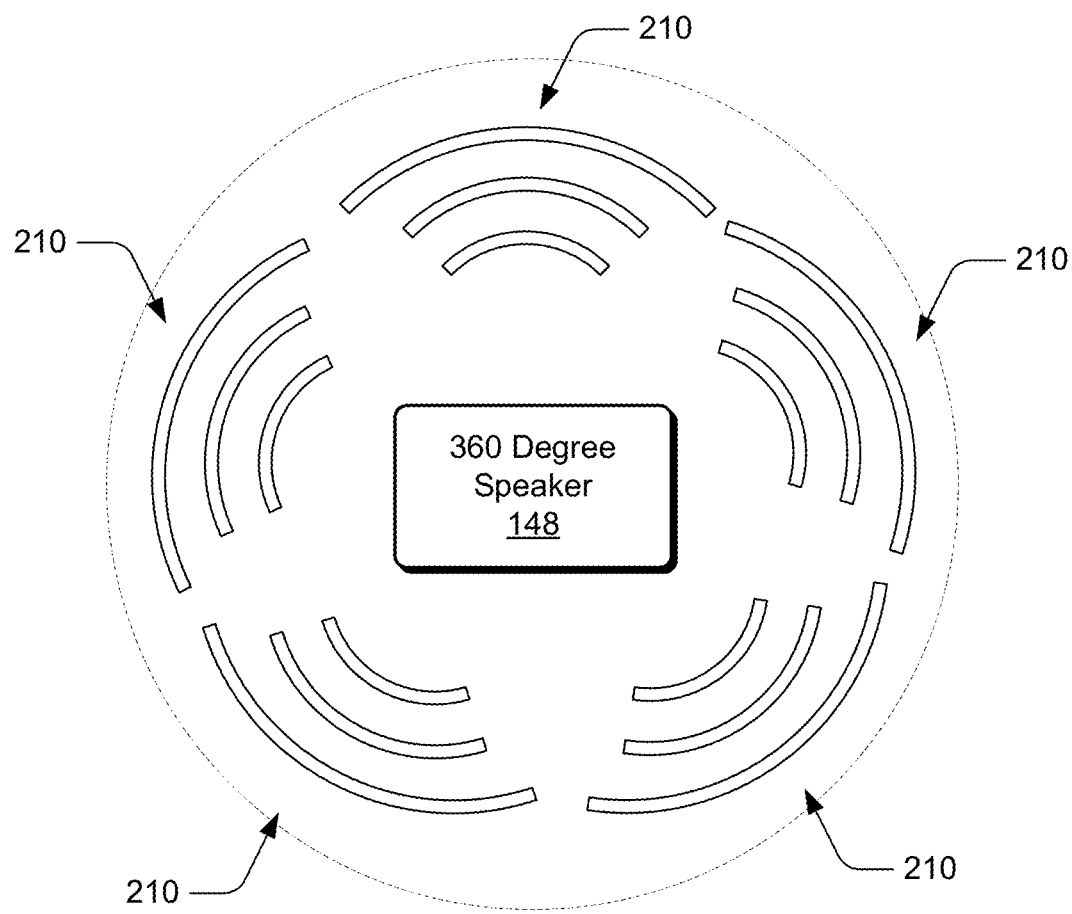

FIGS. 2a-2c depict example audio output attributes of different speakers 136 in accordance with one or more implementations. For instance, FIG. 2a depicts a single sided speaker 144 that provides audio output 200 from a single-sided perspective relative to the single sided speaker 144. The audio output 200, for instance, is substantially unidirectionally from a front surface 202 of the single sided speaker 144.

FIG. 2b depicts a multi-sided speaker 146 that provides audio output 204 from a multi-sided perspective relative to the multi-sided speaker 146. The audio output 204, for instance, is multi-directional relative to a front surface 206 and side surfaces 208 of the multi-sided speaker 146. In implementations, the audio output 204 is multi-directional but is not 360 degrees (e.g., omni-directional) relative to the multi-sided speaker 146.

FIG. 2c depicts a 360 degree speaker that provides audio output 210 from a 360 degree perspective relative to the 360 degree speaker 148. For instance, in implementations where the 360 degree speaker is positioned within an audio device 106, the audio device 106 outputs the audio output 210 in a 360 degree perspective (e.g., omnidirectionally) relative to the audio device 106.

The following section discusses example scenarios for speaker type for audio output in accordance with implementations described herein. As part of the example scenarios, location of the client device 102 is determined relative to instances of the audio devices 106 for adapting audio output of the audio devices 106. Location of the client device 102 relative to the audio devices 106 can be determined in various ways, such as via UWB signal detected between the client device 102 and the audio devices 106, mapping of a location of the client device 102 to the audio device map 142, or a combination thereof. Further, audio output of the audio devices 106 can be adapted based on determined location of the client device 102 relative to the audio devices 106 as well as attributes of the audio devices (e.g., speaker types), such as identified by the audio device attribute table 122 and/or by wireless signal (e.g., UWB signal) transmitted by the audio devices 106, such as via the UWB tags 134.

Figure 3:
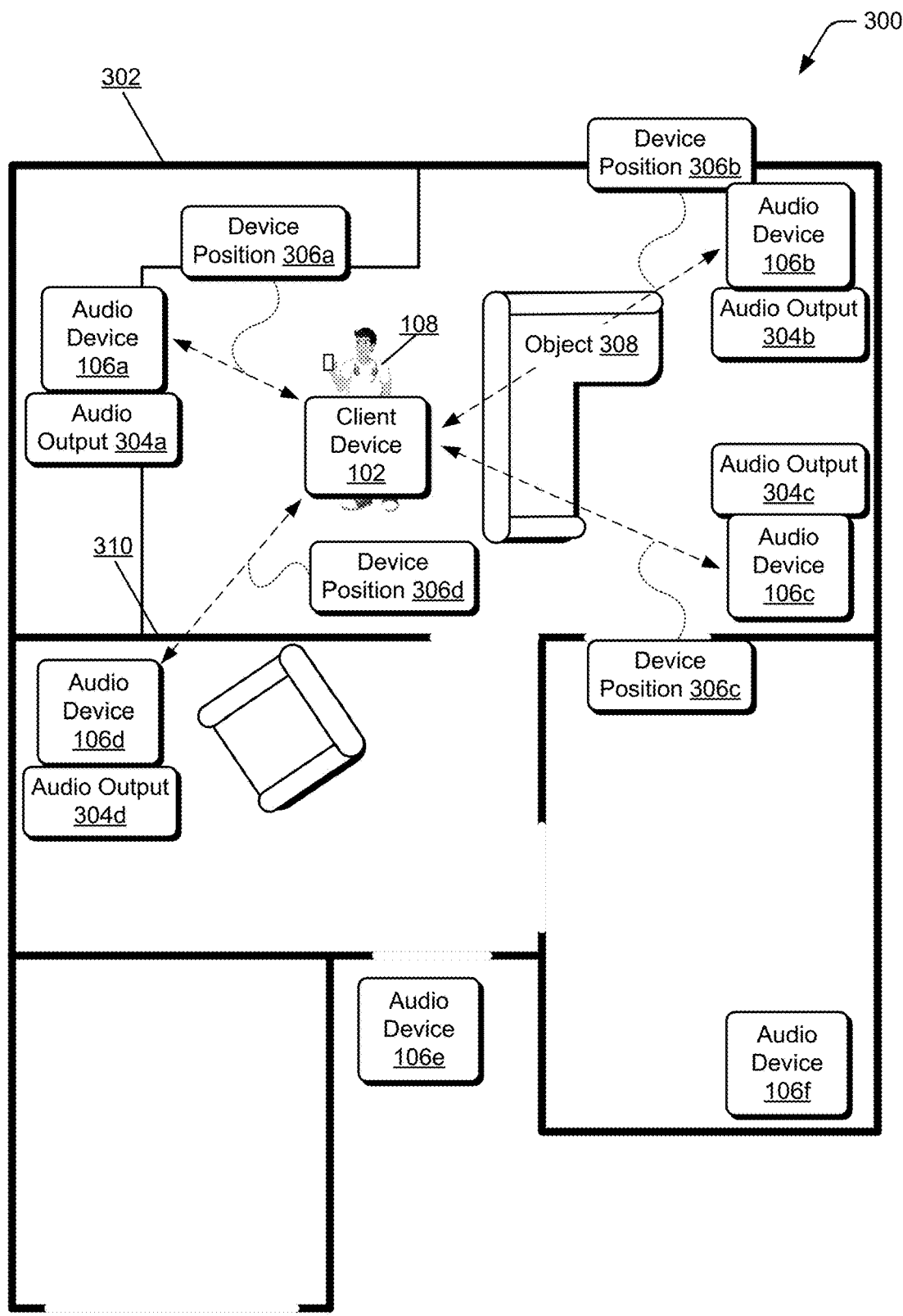
FIG. 3 depicts a scenario for speaker type for audio output in accordance with implementations described herein.

FIG. 3 depicts a scenario 300 for speaker type for audio output in accordance with implementations described herein. The scenario 300 may be implemented in the context of and incorporates attributes of the environment 100. This is not to be construed as limiting, however, and the scenario 300 may be implemented in any suitable environment. Further, aspects of the scenario may be implemented by the client device 102 (e.g., via the audio module 124), by the audio system 104 (e.g., via the controller module 140), and/or cooperatively between the client device 102 and the audio system 104.

The scenario 300 includes the user 108 with the client device 102 positioned within an environment 302. The environment 302, for instance, represents a physical environment in which the user 108 is positioned, such as a home, an office, a public facility, and so forth. Further, the user 108 carries (e.g., wears) the client device 102 while moving between different positions within the environment 302, and different instances of the audio devices 106 are positioned at different locations within the environment 302 as part of the audio system 104. The audio devices 106 are each operable to output audio output 304, such as based on audio signal received from the client device 102, from a different device, and/or generated by the audio system 104. In implementations, the audio system 104 is operable to control the audio output 304 for each audio device 106 based at least in part on a detected location of the client device 102 relative to the audio device 106, attributes of the audio device 106 (e.g., speaker type(s) of one or more speakers 136 the audio device 106), and/or attributes of a path (e.g., a line of sight path and/or a straight path) between the audio device 106 and the client device 102.

For instance, consider that device positions 306 are determined that describe various attributes of a position of the client device 102 relative to instances of the audio devices 106. The device positions 306, for instance, represent data that describes different locational attributes of the client device 102 relative to the audio devices 106, such as estimation of distance between the audio devices 106 and the client device 102, angle of the client device 102 relative to speakers 136 of the audio devices 106, path attributes of paths between the audio devices 106 and the client device 102, and so forth.

In implementations, the device positions 306 are determined based on attributes of wireless signal propagated between the audio devices 106 and the client device 102, such as transmitted by the wireless tags 118 (e.g., the UWB tags 134 at the client device 102 and/or the audio system 104) and detected by the sensors 116, e.g. the wireless sensors 128 at the client device 102 and/or the audio system 104. Alternatively or additionally, the device positions 306 can be determined based on the audio device map 142 that describes physical and/or logical locations of the audio devices 106 within the environment 302.

For instance, a device position 306a is determined based on a position of the client device 102 relative to an audio device 106a. The device position 306a, for example, estimates a distance between the client device 102 and the audio device 106a, an angle of the client device 102 relative to the audio device 106a, and path attributes of a signal propagation path (e.g., a line of sight path) between the audio device 106a and the client device 102.

Accordingly, based on the device position 306a and attributes of the audio device 106a, audio output 304a of the audio device 106a can be adapted to optimize audio reception by the user 108. Attributes of the audio device 106a, for instance, include a speaker type of speakers 136 of the audio device 106a, such as whether the audio device 106a includes a single sided speaker 144, a multi-sided speaker 146, or 360 degree speakers 148. In implementations, adapting the audio output 304a based on the device position 306a can include modifying one or more audio settings of the audio device 106a, such as a volume setting, a tone setting, a balance setting, and so forth.

Further to the scenario 300, device positions 306b, 306c are determined based on a position of the client device 102 relative to audio devices 106b, 106c, respectively. The device positions 306b, 306c, for instance, estimate a distance between the audio devices 106b, 106c, and angles of the client device 102 relative to audio output angles of the audio devices 106b, 106c. In this particular example, the device positions 306b, 306c indicate that an object 308 is detected in a path between the audio devices 106b, 106c and the client device 102. The object 308 represents a physical object positioned between the audio devices 106b, 106c and the client device 102, such as furniture.

Accordingly, audio output 304b, 304c of the audio devices 106b, 106c can be adapted based on attributes (e.g., speaker types) of the audio devices 106b, 106c, estimated distance between the audio devices 106b, 106c and the client device 102, estimated angles of the client device 102 relative to output angles of the audio devices 106b, 106c, as well as detection of the object 308 along audio propagation paths (e.g., line of sight paths, non-line of sight paths, and and/or near-line of sight paths) between the audio devices 106b, 106c and the client device 102. Adaption of the audio output 304b, 304c can be performed in various ways, such as adjusting volume of the audio output 304b, 304c based on attributes of the audio devices 106b, 106c and/or based on the device positions 306b, 306c. In at least one implementation volume of the audio output 304b, 304c can be increased to compensate for sound absorption that may be caused by the object 308. Further, tonal aspects of the audio output 304b, 304c can be adapted to compensate for presence of the object 308, such as by increasing an amount of high-end (e.g., treble) tonal output of the audio output 304b, 304c to compensate for high-end signal absorption by the object 308.

Further to the scenario 300, a device position 306d is determined based on a position of the client device 102 relative to an audio device 106d. In this particular example the device position 306d indicates that a threshold level of obstruction exists between the audio device 106d and the client device 102, such as based on detecting presence of an object 310 (e.g., a wall) between the audio device 106d and the client device 102. Accordingly, based on the device position 306d, audio output 304d of the audio device 106d is adjusted. For instance, the audio output 304d can be maintained in an off position and/or turned off at the audio device 106*d*, such as based on determining that the device position 306*d* indicates that audio reception at the client device 102 from the audio device 106*d* is obstructed by the object 310 to the extent that the audio output 304*d* from the audio device 106*d* may not meet a threshold perceptible volume and/or threshold sound quality.

Figure 4:
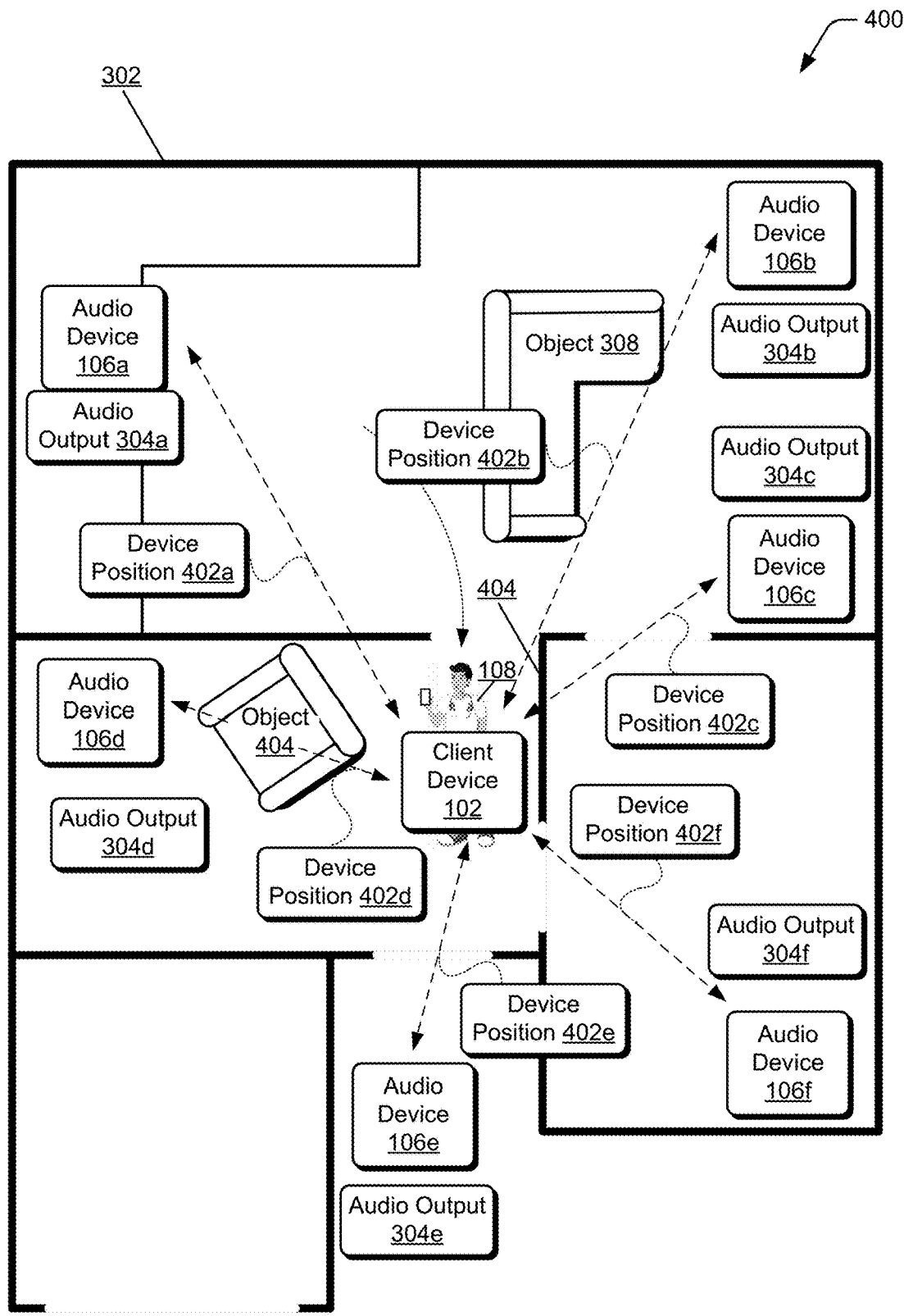
FIG. 4 depicts a scenario for speaker type for audio output in accordance with implementations described herein.

FIG. 4 depicts a scenario 400 for speaker type for audio output in accordance with implementations described herein. In implementations, the scenario 400 represents a continuation of the scenario 300. The scenario 400 may be implemented in the context of and incorporates attributes of the environment 100. This is not to be construed as limiting, however, and the scenario 400 may be implemented in any suitable environment. Further, aspects of the scenario 400 may be implemented by the client device 102 (e.g., via the audio module 124), by the audio system 104 (e.g., via the controller module 140), and/or cooperatively between the client device 102 and the audio system 104.

In the scenario 400 the user 108 and thus the client device 102 moves to a different position (e.g., location) in the environment 302, and thus audio output of at least some of the audio devices 106 is adapted based on the change in position. For instance, device positions 402*a*, 402*b*, 402*c* of the client device 102 relative to the audio devices 106*a*, 106*b*, 106*c*, respectively, are determined. Based on the device positions 402*a*-402*c* and attributes (e.g., speaker types) of the audio devices 106*a*-106*c*, audio output 304*a*-304*c* of the audio devices 106*a*-106*c* is adapted. For instance, the device positions 402*a*, 402*b* indicate that the client device 102 is a threshold distance away from the audio devices 106*a*, 106*b*, and thus the audio output 304*a*, 304*b* is switched off. Further, the device position 402*c* indicates that an object 404 (e.g., a wall) is positioned between the audio device 106*c* and the client device 102, and thus the audio output 304*c* is adapted to compensate for the presence of the object 404. For instance, for the audio output 304*c*, a volume setting is adapted (e.g., increased) and/or a tone setting is modified based on detection of the object 404 between the audio device 106*c* and the client device 102.

Further to the scenario 400 device positions 402*d*, 402*e*, and 402*f* of the client device 102 relative to the audio devices 106*d*, 106*e*, and 106*f*, respectively, are determined. Based on the device positions 402*d*-402*f* and attributes (e.g., speaker types) of the audio devices 106*d*-106*f*, audio output 304*d*-304*f* of the audio devices 106*d*-106*f* is adapted. For instance, the device position 402*d* indicates a distance between the audio device 106*d* and that an object 404 is detected on a path between the audio device 106*d* and the client device 102. Accordingly, one or more audio output settings of the audio device 106*d* for audio output 304*d* are adapted, such as a volume setting and/or a tone setting.

Further, the device position 402*e* indicates a distance between the audio device 106*e* and the client device 102 and that a path between the audio device 106*e* and the client device 102 is free of physical obstructions, e.g., no physical objects are detected on a line of sight path between the audio device 106*e* and the client device 102. Accordingly, audio output 304*e* of the audio device 106*e* is adapted based on attributes of the audio device 106*e* and the device position 402*e*. In implementations, the device positions 402*d*, 402*e* indicate that the client device 102 is approximately an equal distance between the audio device 106*d* and the audio device 106*e*, e.g., within a threshold distance error value. The audio output 304*d*, however, can be adapted differently than the audio output 304*e*, such as based on detection of the object 404 along the path between the audio device 106*d* and the client device 102. For instance, a volume setting of the audio device 106*d* can be set higher than a volume setting of the audio device 106*e* to compensate for sound absorption caused by presence of the object 404. Further, one or more tone settings of the audio device 106*d* can be set differently than one or more tone settings of the audio device 106*e* to compensate for interference with sound propagation caused by the presence of the object 404. Further to the scenario 400, audio output 304*f* of the audio device 106*f* is adapted based on attributes of the audio device 106*f* and the device position 402*f*.

Figure 5:
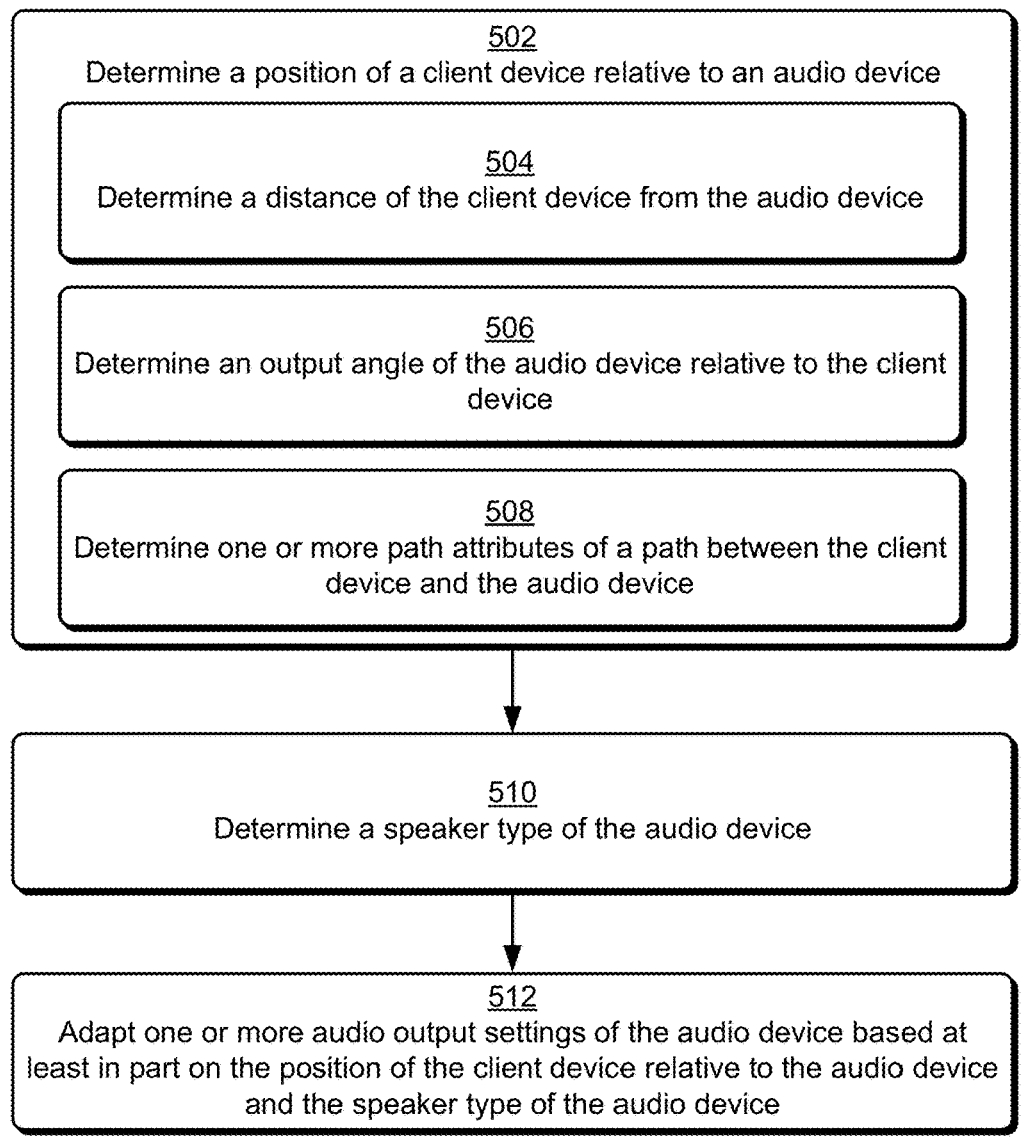
FIG. 5 illustrates a flow chart depicting an example method for speaker type for audio output in accordance with one or more implementations.

FIG. 5 illustrates a flow chart depicting an example method 500 for speaker type for audio output in accordance with one or more implementations. At 502 a position of a client device relative to an audio device is determined. For instance, as part of determining the position of the client device 102 relative to the audio device 106, at 504 a distance of the client device 102 from the audio device 106 is determined. For instance, wireless signal attributes of wireless signal (e.g., UWB signal from one or more UWB tags 134) transmitted between the client device 102 and the audio device 106 are processed to estimate a distance between the client device 102 and the audio device 106.

At 506 an output angle of the audio device relative to the client device is determined. In implementations, the output angle is determined based on a speaker type of the audio device 106 and an orientation of the client device 102 relative to the audio device 106. For instance, UWB signal transmitted between the client device 102 and the audio device 106 indicates an estimated angle of orientation of the client device relative to an audio output direction of the audio device 106.

At 508 one or more path attributes of a path between the client device and the audio device are determined. The path attributes, for instance, represent attributes of a signal propagation path between the client device 102 and the audio device 106. In implementations, path attributes of a path between the client device 102 and the audio device 106 can be determined by using By using UWB Time of flight (TOF) and comparing to Received Signal Strength Indicator (RSSI). For instance, UWB in a same channel as TOF ranging, and/or Bluetooth and/or WiFi RSSI measurements can be used to determine if a line of sight path between the client device 102 and the audio device 106 is in free space or through some lossy medium (e.g., an object), such as furniture, a wall, etc.

For instance, using such a technique, path loss ($L_{total}$) can be determined as (See. e.g., *Propagation data and prediction methods for the planning of indoor radiocommunication systems and radio local area networks in the frequency range 300 MHz to 100 GHz*, https://www.itu.int/dms_pubrec/itu-r/rec/p/R-REC-P.1238-8-201507-S!!PDF-E.pdf, retrieved 6 Dec. 2022):

$$L_{total}=L(do)+N \log 10(d/do)+Lf(n)$$

N=distance power loss coefficient, f=freq (MHz), d=distance (m), L(do)=path loss at reference distance, example 1 meter Lf=floor loss penetration factor, n=number of floors between BS and client device, Lf=0 for n=0

N=28 for 2.4 GHz, 28 for 5.2 GHz, 24 for 5.8 GHz

Example 2.4 GHz Free Space (Bluetooth Low Energy) for do=1, 2.4 GHz@3 m, $L_{total}$=20 log(f)−28+N log(d) =53 dB If transmit Power−RSSI<<53 dB, then not line of sight.

In implementations, visual attributes (e.g., a digital panoramic photograph) along wireless signal attributes of an environment in which audio devices 106 are positioned can be utilized to obtain an estimation of audio device 106 locations, such as for the audio device map 142.

At 510 a speaker type of the audio device is determined. The speaker type can be determined in various ways, such as by obtaining ID information 138 from the audio device 106 and matching the ID information 138 to the audio device attribute table 122. As referenced above, for example, the audio device attribute table 122 specifies attributes of different types of audio devices 106, such as speaker types for speakers 136 of the different audio devices 106. Alternatively or additionally, the audio device 106 transmits a beacon (e.g., a UWB signal from a UWB tag 134) that identifies attributes of the audio device 106 including a speaker type.

At 512 one or more audio output settings of the audio device are adapted based at least in part on the position of the client device relative to the audio device and the speaker type of the audio device. Different ways for adapting audio output settings are described above, such as by modifying audio output volume, tone settings, output balance, and so forth.

Figure 6:
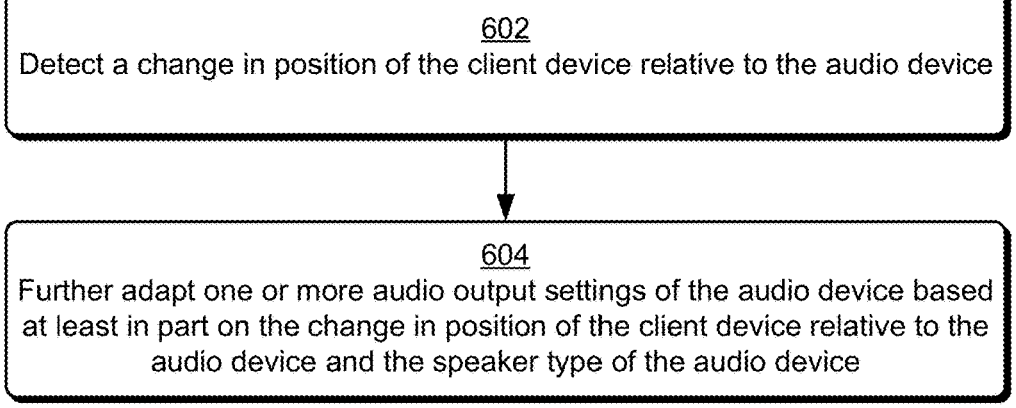
FIG. 6 illustrates a flow chart depicting an example method for speaker type for audio output in accordance with one or more implementations.

FIG. 6 illustrates a flow chart depicting an example method 600 for speaker type for audio output in accordance with one or more implementations. The method 600, for instance, can be implemented in conjunction with the method 500 to adapt to changes in user position.

At 602 a change in position of the client device relative to the audio device is detected. For instance, position of the client device 102 is monitored in real time, such as based on UWB signal transmitted between the client device 102 and instances of the audio devices 106. Thus, when the client device 102 changes position (e.g., based on movement of the user 108), a new position of the client device 102 is determined. The new position of the client device 102 can include various attributes such as described above, including distance of the client device 102 from the audio device 106, output angle of the audio device 106 relative to the client device 102, path attributes of a path between the client device 102 and the audio device 106, etc.

At 604 one or more audio output settings of the audio device are further adapted based at least in part on the change in position of the client device relative to the audio device and the speaker type of the audio device. For instance, one or more audio output settings of the audio device 106 are modified based on the change in position of the client device 102, such as to adapt to a change in distance between the client device 102 and the audio device, a change in output angle of the audio device 106 relative to the client device 102, a change in path attributes of a path between the client device 102 and the audio device 106, and so forth.

In implementations, the methods 500, 600 are applicable to dynamically adapt audio output settings of multiple audio devices 106 to a position of the client device 102, as well as to dynamically adapt audio settings when a position of the client device 102 changes. The methods 500, 600, for instance, can be simultaneously and/or concurrently applied to multiple different instances of the audio devices 106.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 7:
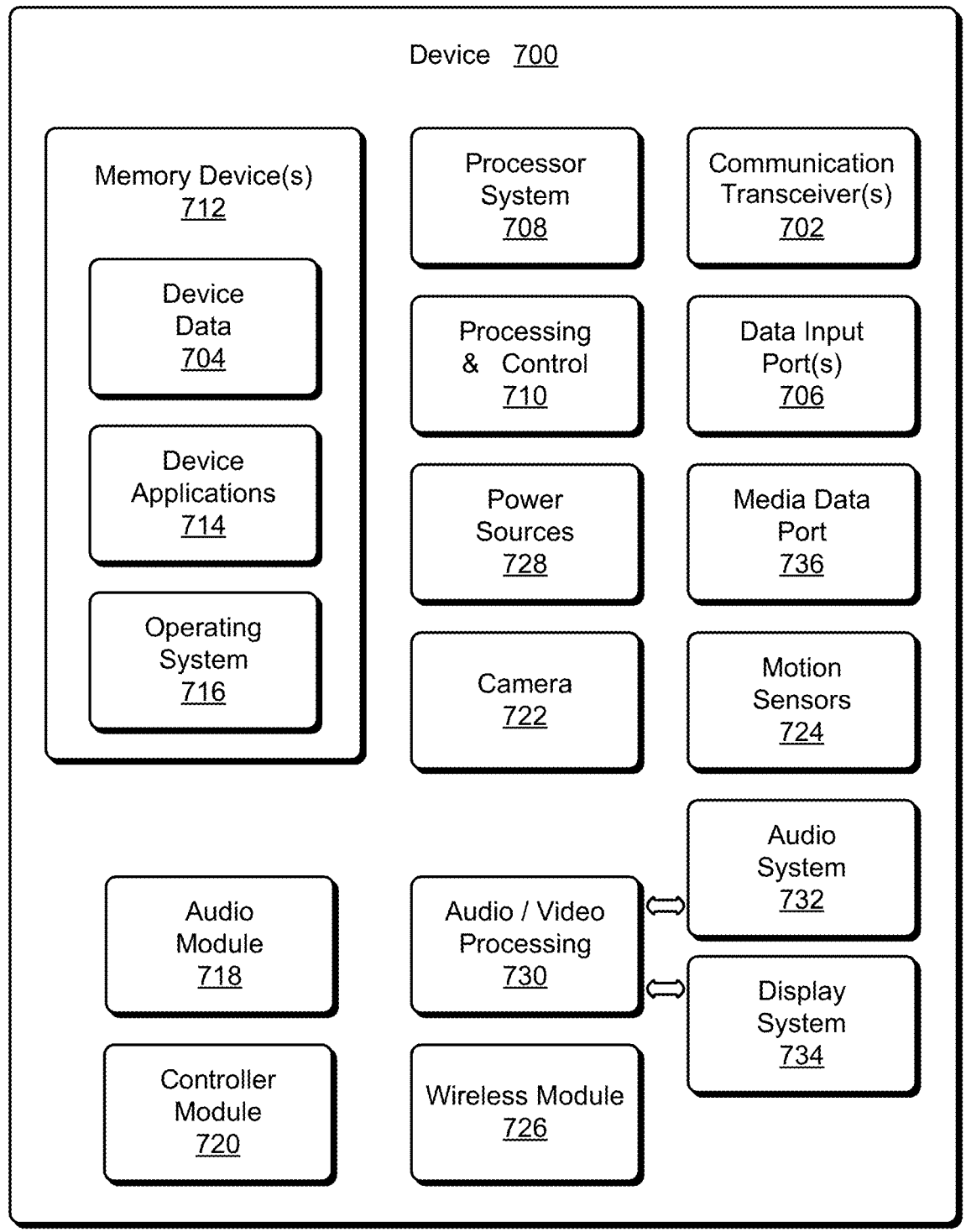
FIG. 7 illustrates various components of an example device in which aspects of speaker type for audio output can be implemented.

FIG. 7 illustrates various components of an example device 700 in which aspects of speaker type for audio output can be implemented. The example device 700 can be implemented as any of the devices and/or apparatus described with reference to the previous FIGS. 1-6, such as any type of client device, mobile phone, mobile device, wearable device, tablet, computing, communication, entertainment, gaming, media playback, and/or other type of electronic device. For example, the client device 102 and/or the audio system 104 as shown and described with reference to FIGS. 1-6 may be implemented as the example device 700.

The device 700 includes communication transceivers 702 that enable wired and/or wireless communication of device data 704 with other devices. The device data 704 can include any of device identifying data, device location data, wireless connectivity data, and wireless protocol data. Additionally, the device data 704 can include any type of audio, video, and/or image data. Example communication transceivers 702 include wireless personal area network (WPAN) radios compliant with various IEEE 702.15 (Bluetooth™) standards, wireless local area network (WLAN) radios compliant with any of the various IEEE 702.11 (Wi-Fi™) standards, wireless wide area network (WWAN) radios for cellular phone communication, wireless metropolitan area network (WMAN) radios compliant with various IEEE 702.16 (WiMAX™) standards, and wired local area network (LAN) Ethernet transceivers for network data communication.

The device 700 may also include one or more data input ports 706 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 700 includes a processing system 708 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 710. The device 700 may further include any type of a system bus or other data and command transfer system that couples the various components within the device. A system bus can include any one or combination of different bus structures and architectures, as well as control and data lines.

The device 700 also includes computer-readable storage memory 712 (e.g., memory devices) that enable data storage, such as data storage devices that can be accessed by a computing device, and that provide persistent storage of data and executable instructions (e.g., software applications, programs, functions, and the like). Examples of the computer-readable storage memory 712 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 700 may also include a mass storage media device.

The computer-readable storage memory 712 provides data storage mechanisms to store the device data 704, other types of information and/or data, and various device applications 714 (e.g., software applications). For example, an operating system 716 can be maintained as software instructions with a memory device and executed by the processing system 708. The device applications may also include a device manager, such as any form of a control application, software application, signal-processing and control module, code that is native to a particular device, a hardware abstraction layer for a particular device, and so on. Computer-readable storage memory 712 represents media and/or devices that enable persistent and/or non-transitory storage of information in contrast to mere signal transmission, carrier waves, or signals per se. Computer-readable storage memory 712 do not include signals per se or transitory signals.

In this example, the device 700 includes an audio module 718 and a controller module 720 that implement aspects of speaker type for audio output and may be implemented with hardware components and/or in software as one of the device applications 714. For example, the audio module 718 can be implemented as the audio module 124 and the controller module 720 can be implemented as the controller module 140, described in detail above. In implementations, the audio module 718 and/or the controller module 720 include independent processing, memory, and logic components as a computing and/or electronic device integrated with the device 700.

In this example, the example device 700 also includes a camera 722 and motion sensors 724, such as may be implemented in an inertial measurement unit (IMU). The motion sensors 724 can be implemented with various sensors, such as a gyroscope, an accelerometer, and/or other types of motion sensors to sense motion of the device. The various motion sensors 724 may also be implemented as components of an inertial measurement unit in the device.

The device 700 also includes a wireless module 726, which is representative of functionality to perform various wireless communication tasks. For instance, for the client device 102, the wireless module 726 can be leveraged to scan for and detect wireless networks, as well as negotiate wireless connectivity to wireless networks for the client device 102. The device 700 can also include one or more power sources 728, such as when the device is implemented as a mobile device. The power sources 728 may include a charging and/or power system, and can be implemented as a flexible strip battery, a rechargeable battery, a charged super-capacitor, and/or any other type of active or passive power source.

The device 700 also includes an audio and/or video processing system 730 that generates audio data for an audio system 732 and/or generates display data for a display system 734. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 736. In implementations, the audio system and/or the display system are integrated components of the example device. Alternatively, the audio system and/or the display system are external, peripheral components to the example device.

Although implementations of speaker type for audio output have been described in language specific to features and/or methods, the subject of the appended claims is not necessarily limited to the specific features or methods described. Rather, the features and methods are disclosed as example implementations, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

In addition to the previously described methods, any one or more of the following:

In some aspects, the techniques described herein relate to an apparatus including: a processor: and a memory coupled to the processor, the memory and the processor configured to cause the apparatus to: determine a position of a client device relative to an audio device; determine a speaker type of the audio device: and adapt one or more audio output settings of the audio device based at least in part on the position of the client device relative to the audio device, and the speaker type of the audio device.

In some aspects, the techniques described herein relate to an apparatus, wherein the memory and the processor are configured to cause the apparatus to determine the position of the client device relative to the audio device based at least in part on an ultra-wideband signal detected at one or more of the client device or the audio device.

In some aspects, the techniques described herein relate to an apparatus, wherein the memory and the processor are configured to cause the apparatus to determine the position of the client device relative to the audio device based at least in part on one or more attributes of a line of sight path between the client device and the audio device.

In some aspects, the techniques described herein relate to an apparatus, wherein the memory and the processor are configured to cause the apparatus to determine the speaker type of the audio device based at least in part on mapping an identifier for the audio device to an indication of a speaker type associated with the identifier.

In some aspects, the techniques described herein relate to an apparatus, wherein the memory and the processor are configured to cause the apparatus to determine the position of the client device relative to the audio device based at least in part on an output angle of the audio device relative to the client device.

In some aspects, the techniques described herein relate to an apparatus, wherein the memory and the processor are configured to cause the apparatus to determine that an object is detected between the audio device and the client device, and to adapt the one or more audio output settings of the audio device based at least in part on detection of the object between the audio device and the client device.

In some aspects, the techniques described herein relate to an apparatus, wherein the memory and the processor are configured to cause the apparatus to determine that the object is detected between the audio device and the client device based at least in part on a comparison of a time of flight measurement and a received signal strength indication of wireless signals between the client device and the audio device.

In some aspects, the techniques described herein relate to an apparatus, wherein the memory and the processor are configured to cause the apparatus to determine the speaker type as one or more of a single-directional speaker, a multi-directional speaker, or a 360 degree speaker.

In some aspects, the techniques described herein relate to an apparatus, wherein the one or more audio output settings include one or more of a volume setting, a tone setting, or a balance setting.

In some aspects, the techniques described herein relate to an apparatus, wherein the audio device is part of a set of audio devices, and wherein the memory and the processor are configured to cause the apparatus to: determine a position of the client device relative to each audio device of the set of audio devices: determine a speaker type of each audio device of the set of audio devices; and dynamically adapt one or more audio output settings of each audio device of the set of audio devices based at least in part on the position of the client device relative to each audio device of the set of audio devices, and the speaker type of each audio device of the set of audio devices.

In some aspects, the techniques described herein relate to an apparatus, wherein the memory and the processor are configured to cause the apparatus to: detect a change in position of the client device relative to the audio device; and further adapt one or more audio output settings of the audio device based at least in part on the change in position of the client device relative to the audio device and the speaker type of the audio device.

In some aspects, the techniques described herein relate to an apparatus including: a processor: and a memory coupled to the processor, the memory and the processor configured to cause the apparatus to: determine one or more path attributes of a path between a client device and an audio device: determine a speaker type of the audio device; and adapt one or more audio output settings of the audio device based at least in part on the one or more path attributes and the speaker type of the audio device.

In some aspects, the techniques described herein relate to an apparatus, wherein the memory and the processor are configured to cause the apparatus to determine the one or more path attributes of the path between the client device and the audio device based at least in part on an ultra-wideband signal detected at one or more of the client device or the audio device.

In some aspects, the techniques described herein relate to an apparatus, wherein the one or more path attributes include an indication of whether an object is detected on the path.

In some aspects, the techniques described herein relate to an apparatus, wherein the one or more path attributes include an indication that an object is detected on the path, and wherein the memory and the processor are configured to cause the apparatus to adapt one or more of a volume setting or a tone setting of the audio device to compensate for presence of the object on the path.

In some aspects, the techniques described herein relate to an apparatus, wherein the memory and the processor are configured to cause the apparatus to determine the one or more path attributes based at least in part on a comparison of a time of flight measurement and a received signal strength indication of wireless signals between the client device and the audio device.

In some aspects, the techniques described herein relate to an apparatus, wherein the memory and the processor are configured to cause the apparatus to determine the speaker type as one or more of a single-directional speaker, a multi-directional speaker, or a 360 degree speaker.

In some aspects, the techniques described herein relate to a method including: determining a position of a client device relative to an audio device; determining a speaker type of the audio device: and adapting one or more audio output settings of the audio device based at least in part on the position of the client device relative to the audio device, and the speaker type of the audio device.

In some aspects, the techniques described herein relate to a method, wherein determining the speaker type of the audio device includes determining whether the speaker type is a single-directional speaker, a multi-directional speaker, or a 360 degree speaker.

The invention claimed is:

1. An apparatus comprising:
a processor; and
a memory coupled to the processor, the memory and the processor configured to cause the apparatus to:
determine a position of a client device relative to an audio device;
determine a speaker type of the audio device;
determine an object presence detected on a path between the audio device and the client device; and
adapt one or more audio output settings of the audio device based at least in part on the position of the client device relative to the audio device, the speaker type of the audio device, and the object presence detected on the path between the audio device and the client device.

2. The apparatus of claim 1, wherein the memory and the processor are configured to cause the apparatus to determine the position of the client device relative to the audio device based at least in part on an ultra-wideband signal detected at one or more of the client device or the audio device.

3. The apparatus of claim 1, wherein the memory and the processor are configured to cause the apparatus to determine the position of the client device relative to the audio device based at least in part on one or more attributes of a line of sight path between the client device and the audio device.

4. The apparatus of claim 1, wherein the memory and the processor are configured to cause the apparatus to determine the speaker type of the audio device based at least in part on mapping an identifier for the audio device to an indication of a speaker type associated with the identifier.

5. The apparatus of claim 1, wherein the memory and the processor are configured to cause the apparatus to determine the position of the client device relative to the audio device based at least in part on an output angle of the audio device relative to the client device.

6. The apparatus of claim 1, wherein the memory and the processor are configured to cause the apparatus to determine that the object presence is detected on the path between the audio device and the client device based at least in part on a comparison of a time of flight measurement and a received signal strength indication of wireless signals between the client device and the audio device.

7. The apparatus of claim 1, wherein the memory and the processor are configured to cause the apparatus to determine the speaker type as one or more of a single-directional speaker, a multi-directional speaker, or a 360 degree speaker.

8. The apparatus of claim 1, wherein the one or more audio output settings comprise one or more of a volume setting, a tone setting, or a balance setting.

9. The apparatus of claim 1, wherein the audio device is part of a set of audio devices, and wherein the memory and the processor are configured to cause the apparatus to:
determine a position of the client device relative to each audio device of the set of audio devices;
determine a speaker type of each audio device of the set of audio devices; and
dynamically adapt one or more audio output settings of each audio device of the set of audio devices based at least in part on the position of the client device relative to each audio device of the set of audio devices, and the speaker type of each audio device of the set of audio devices.

10. The apparatus of claim 1, wherein the memory and the processor are configured to cause the apparatus to:
detect a change in position of the client device relative to the audio device; and
further adapt one or more audio output settings of the audio device based at least in part on the change in position of the client device relative to the audio device and the speaker type of the audio device.

11. An apparatus comprising:
a processor; and
a memory coupled to the processor, the memory and the processor configured to cause the apparatus to:
determine one or more path attributes of a path between a client device and an audio device, the one or more path attributes including an indication of an object presence detected on the path;
determine a speaker type of the audio device; and
adapt one or more audio output settings of the audio device based at least in part on the one or more path attributes and the speaker type of the audio device by changing the one or more audio output settings of the audio device based on the object presence detected on the path.

12. The apparatus of claim 11, wherein the memory and the processor are configured to cause the apparatus to determine the one or more path attributes of the path between the client device and the audio device based at least in part on an ultra-wideband signal detected at one or more of the client device or the audio device.

13. The apparatus of claim 11, wherein the memory and the processor are configured to cause the apparatus to adapt one or more of a volume setting or a tone setting of the audio device when changing the one or more audio output settings of the audio device that compensate sound absorption losses caused by the object presence detected on the path.

14. The apparatus of claim 12, wherein the memory and the processor are configured to cause the apparatus to:
calculate a path loss based on the ultra-wideband signal that indicates the object presence detected on the path; and
adapt the one or more audio output settings of the audio device by increasing a volume setting or changing a tone setting of the audio device to compensate for the path loss.

15. The apparatus of claim 11, wherein the memory and the processor are configured to cause the apparatus to determine the one or more path attributes based at least in part on a comparison of a time of flight measurement and a received signal strength indication of wireless signals between the client device and the audio device.

16. The apparatus of claim 11, wherein the memory and the processor are configured to cause the apparatus to determine the speaker type as one or more of a single-directional speaker, a multi-directional speaker, or a 360 degree speaker.

17. The apparatus of claim 11, wherein the indication of the object presence is based on at least in part on a detection of a threshold level of obstruction on the path between the client device and the audio device.

18. A method comprising:
determining a position of a client device relative to an audio device;
determining an object presence detected on a path between the audio device and the client device;
determining a speaker type of the audio device; and
adapting one or more audio output settings of the audio device based at least in part on the position of the client device relative to the audio device, the speaker type of the audio device, and the object presence detected on the path between the audio device and the client device.

19. The method of claim 18, wherein determining the speaker type of the audio device comprises determining whether the speaker type is a single-directional speaker, a multi-directional speaker, or a 360 degree speaker.

20. The method of claim 18, further comprising determining one or more path attributes of the path between the client device and the audio device, and wherein adapting the one or more audio output settings is further based at least in part on the one or more path attributes.

* * * * *